US012562860B2

(12) United States Patent
Khoshnevisan et al.

(10) Patent No.: US 12,562,860 B2
(45) Date of Patent: Feb. 24, 2026

(54) SOUNDING REFERENCE SIGNAL PRECODING

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 18/348,730

(22) Filed: Jul. 7, 2023

(65) Prior Publication Data

US 2024/0039667 A1      Feb. 1, 2024

Related U.S. Application Data

(60) Provisional application No. 63/369,906, filed on Jul. 29, 2022.

(51) Int. Cl.
 H04L 5/00      (2006.01)
(52) U.S. Cl.
 CPC ................................. H04L 5/0048 (2013.01)
(58) Field of Classification Search
 CPC ............................ H04L 5/0048; H04L 5/0051
 See application file for complete search history.

(56) References Cited

U.S. PATENT DOCUMENTS

| | | | | |
|---|---|---|---|---|
| 2019/0109679 A1* | 4/2019 | Liu | ........................ | H04L 5/0048 |
| 2019/0305833 A1* | 10/2019 | Kim | ...................... | H04L 5/0048 |
| 2021/0281448 A1* | 9/2021 | Li | .......................... | H04W 72/21 |
| 2022/0216963 A1* | 7/2022 | Chen | ..................... | H04L 5/0023 |
| 2023/0299914 A1* | 9/2023 | Lim | ...................... | H04B 7/0639 |
| | | | | 370/329 |
| 2023/0318782 A1* | 10/2023 | Go | ........................ | H04L 5/0023 |
| | | | | 370/329 |
| 2024/0259158 A1* | 8/2024 | Wang | ................... | H04B 7/0404 |

* cited by examiner

*Primary Examiner* — Noel R Beharry
*Assistant Examiner* — Phillip J Kearns
(74) *Attorney, Agent, or Firm* — QUALCOMM Incorporated

(57)      ABSTRACT

Various aspects of the present disclosure generally relate to wireless communication. In some aspects, a user equipment (UE) may receive an indication of a sounding reference signal (SRS) resource for SRS precoding that is based at least in part on a downlink measurement, where a total quantity of configured SRS ports for transmission is less than or equal to a quantity of receive antennas configured at the UE. The UE may transmit an SRS with SRS precoding based at least in part on the SRS resource. Numerous other aspects are described.

30 Claims, 14 Drawing Sheets

Receive an indication of a sounding reference signal (SRS) resource for SRS precoding that is based at least in part on a downlink measurement, wherein a total quantity of configured SRS ports for transmission is less than or equal to a quantity of receive antennas configured at the UE

1110

Transmit an SRS with SRS precoding based at least in part on the SRS resource

1120

1100

1210 — Transmit an indication of an SRS resource for SRS precoding that is based at least in part on a downlink measurement 1220 — Receive an SRS in association with the SRS resource

1200

SOUNDING REFERENCE SIGNAL PRECODING

CROSS-REFERENCE TO RELATED APPLICATION

This Patent Application claims priority to U.S. Provisional Patent Application No. 63/369,906, filed on Jul. 29, 2022, entitled "SOUNDING REFERENCE SIGNAL PRE-CODING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sounding reference signal precoding.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving an indication of a sounding reference signal (SRS) resource for SRS precoding that is based at least in part on a downlink measurement, where a total quantity of configured SRS ports for transmission is less than or equal to a quantity of receive antennas configured at the UE. The method may include transmitting an SRS with SRS precoding based at least in part on the SRS resource.

Some aspects described herein relate to a method of wireless communication performed by a network entity. The method may include transmitting an indication of an SRS resource for SRS precoding that is based at least in part on a downlink measurement. The method may include receiving an SRS in association with the SRS resource.

Some aspects described herein relate to a UE for wireless communication. The UE may include one or more memories and one or more processors coupled to the one or more memories. The one or more processors may be individually or collectively configured to cause the UE to receive an indication of an SRS resource for SRS precoding that is based at least in part on a downlink measurement, where a total quantity of configured SRS ports for transmission is less than or equal to a quantity of receive antennas configured at the UE. The one or more processors may be individually or collectively configured to cause the UE to transmit an SRS with SRS precoding based at least in part on the SRS resource.

Some aspects described herein relate to a network entity for wireless communication. The network entity may include one or more memories and one or more processors coupled to the one or more memories. The one or more processors may be individually or collectively configured to cause the network entity to transmit an indication of an SRS resource for SRS precoding that is based at least in part on a downlink measurement. The one or more processors may be individually or collectively configured to cause the network entity to receive an SRS in association with the SRS resource.

Some aspects described herein relate to a non-transitory computer-readable medium that stores a set of instructions for wireless communication by a UE. The set of instructions, when executed by one or more processors of the UE, may cause the UE to receive an indication of an SRS resource for SRS precoding that is based at least in part on a downlink measurement, where a total quantity of configured SRS ports for transmission is less than or equal to a quantity of receive antennas configured at the UE. The set of instructions, when executed by one or more processors of the UE, may cause the UE to transmit an SRS with SRS precoding based at least in part on the SRS resource.

Some aspects described herein relate to a non-transitory computer-readable medium that stores a set of instructions for wireless communication by a network entity. The set of instructions, when executed by one or more processors of the network entity, may cause the network entity to transmit an indication of an SRS resource for SRS precoding that is based at least in part on a downlink measurement. The set of instructions, when executed by one or more processors of the network entity, may cause the network entity to receive an SRS in association with the SRS resource.

Some aspects described herein relate to an apparatus for wireless communication. The apparatus may include means for receiving an indication of an SRS resource for SRS precoding that is based at least in part on a downlink measurement, where a total quantity of configured SRS ports for transmission is less than or equal to a quantity of receive antennas configured at the apparatus. The apparatus may include means for transmitting an SRS with SRS precoding based at least in part on the SRS resource.

Some aspects described herein relate to an apparatus for wireless communication. The apparatus may include means for transmitting an indication of an SRS resource for SRS precoding that is based at least in part on a downlink measurement. The apparatus may include means for receiving an SRS in association with the SRS resource.

Aspects generally include a method, apparatus, system, computer program product, non-transitory computer-readable medium, UE, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example of SRS resources, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
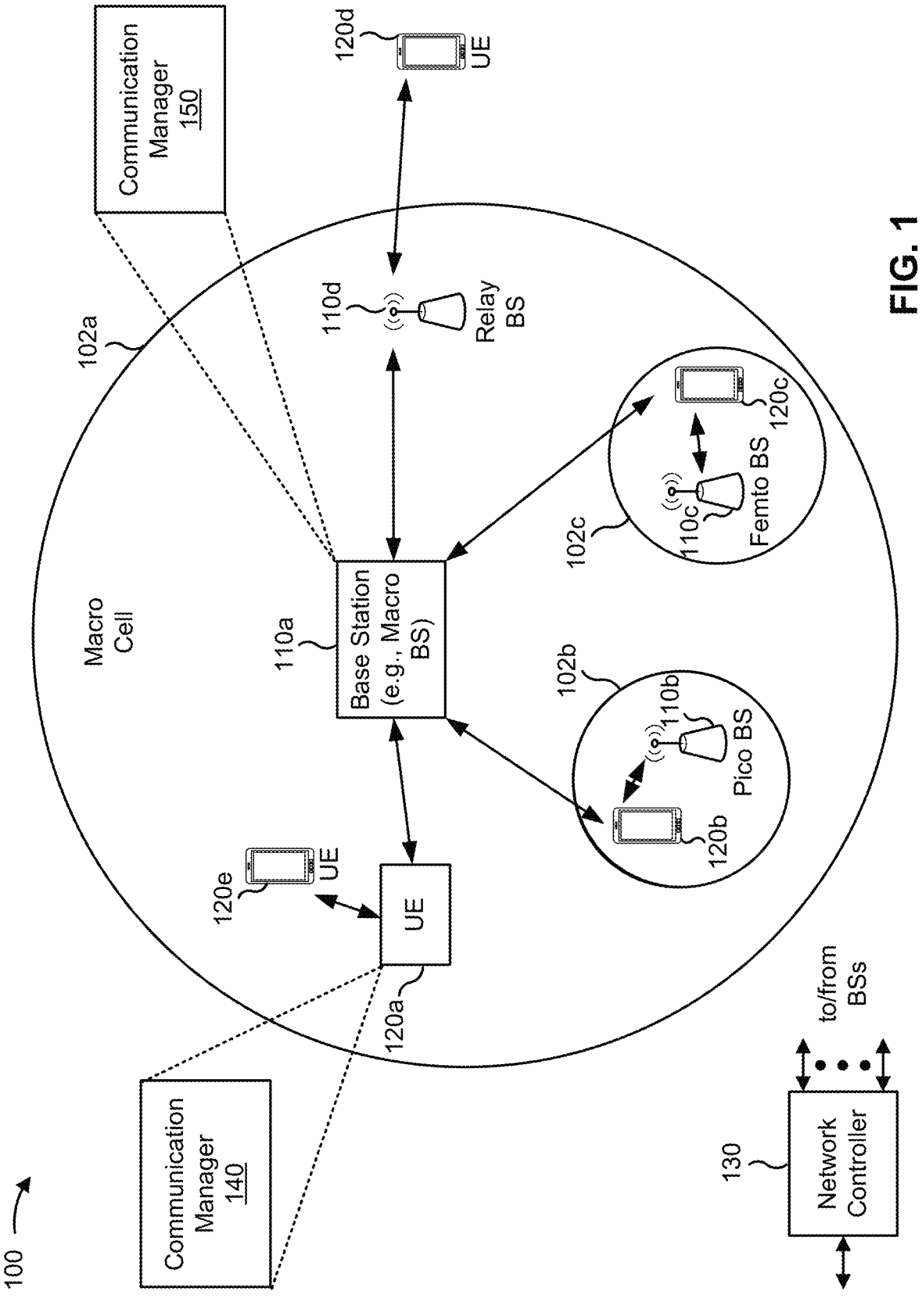
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a user equipment (UE) 120 or multiple UEs 120 (shown as a UE 120a, a UE 120b, a UE 120c, a UE 120d, and a UE 120e). The wireless network 100 may also include one or more network entities, such as base stations 110 (shown as a BS 110a, a BS 110b, a BS 110c, and a BS 110d), and/or other network entities. A base station 110 is a network entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network entities in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network with network entities that include different types of BS s, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of network entities and may provide coordination and control for these network entities. The network controller 130 may communicate with the base stations 110 via a backhaul communication link. The network entities may communicate with one another directly or indirectly via a wireless or wireline backhaul communication link.

The UEs 120 may be dispersed throughout the wireless network 100, and each UE 120 may be stationary or mobile.

A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an indication of a sounding reference signal (SRS) resource for SRS precoding that is based at least in part on a downlink measurement, where a total quantity of configured SRS ports for transmission is less than or equal to a quantity of receive antennas configured at the UE. The communication manager 140 may transmit an SRS with SRS precoding based at least in part on the SRS resource. Additionally, or alternatively, the communication manager 140 may perform one or more other operations described herein.

In some aspects, a network entity (e.g., base station 110) may include a communication manager 150. As described in more detail elsewhere herein, the communication manager 150 may transmit an indication of an SRS resource for SRS precoding that is based at least in part on a downlink measurement; and receive an SRS in association with the SRS resource. Additionally, or alternatively, the communication manager 150 may perform one or more other operations described herein.

As indicated above, FIG. 1 is provided as an example. Other examples may differ from what is described with regard to FIG. 1.

Figure 2:
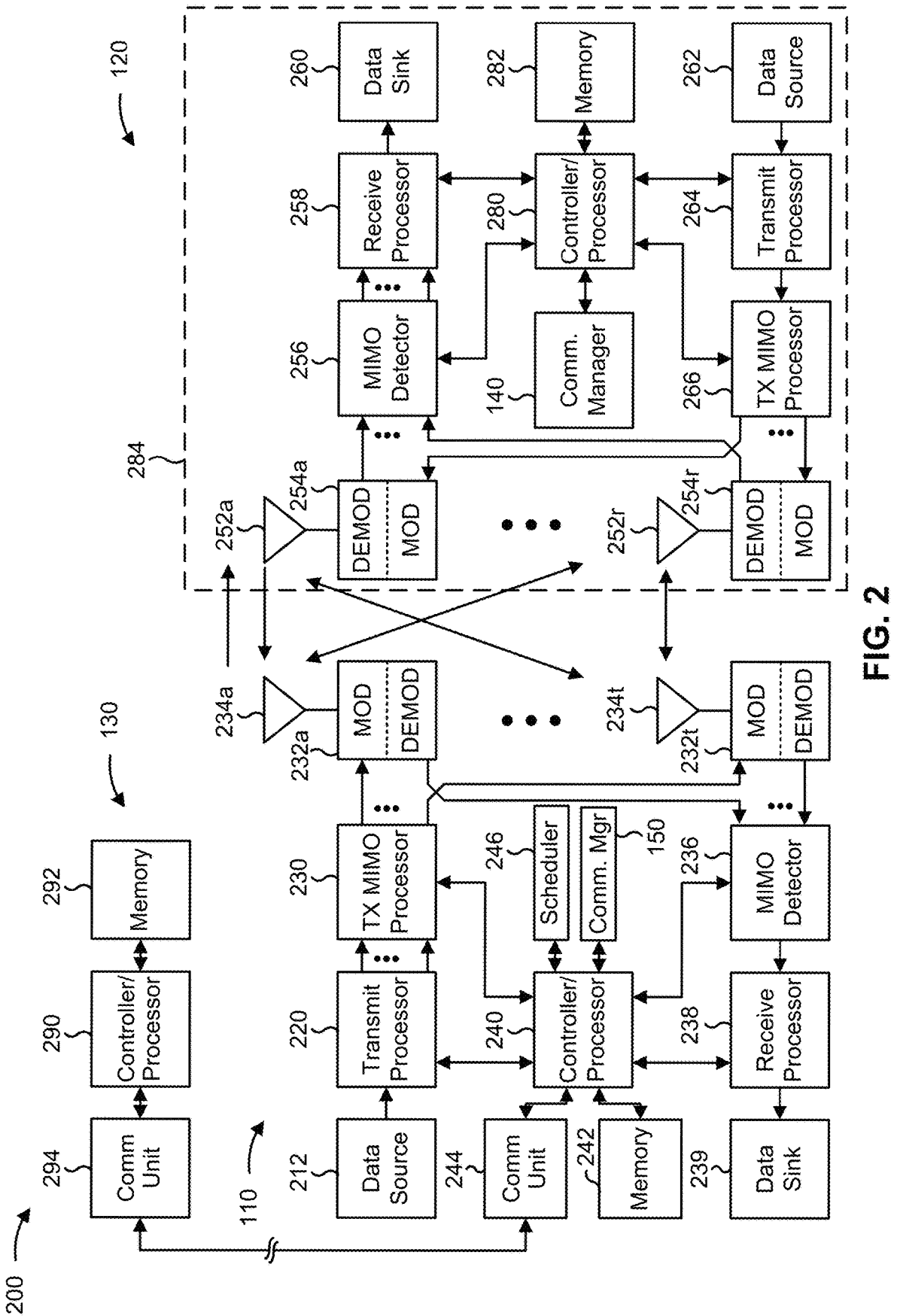
FIG. 2 is a diagram illustrating an example of a network entity (e.g., base station) in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCS s) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-14).

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-14).

A controller/processor of a network entity (e.g., the controller/processor 240 of the base station 110), the controller/ processor 280 of the UE 120, and/or any other component(s) of FIG. 2 may perform one or more techniques associated with SRS precoding, as described in more detail elsewhere herein. For example, the controller/processor 240 of the base station 110, the controller/processor 280 of the UE 120, and/or any other component(s) of FIG. 2 may perform or direct operations of, for example, process 1100 of FIG. 1, process 1200 of FIG. 12, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 1100 of FIG. 1, process 1200 of FIG. 12, and/or other processes as described herein. In some examples, executing instructions may include running the instructions, converting the instructions, compiling the instructions, and/or interpreting the instructions, among other examples.

In some aspects, a UE (e.g., a UE 120) includes means for receiving an indication of an SRS resource for SRS precoding that is based at least in part on a downlink measurement, where a total quantity of configured SRS ports for transmission is less than or equal to a quantity of receive antennas configured at the UE; and/or means for transmitting an SRS with SRS precoding based at least in part on the SRS resource. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., a base station 110) includes means for transmitting an indication of an SRS resource for SRS precoding that is based at least in part on a downlink measurement; and/or means for receiving an SRS in association with the SRS resource. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
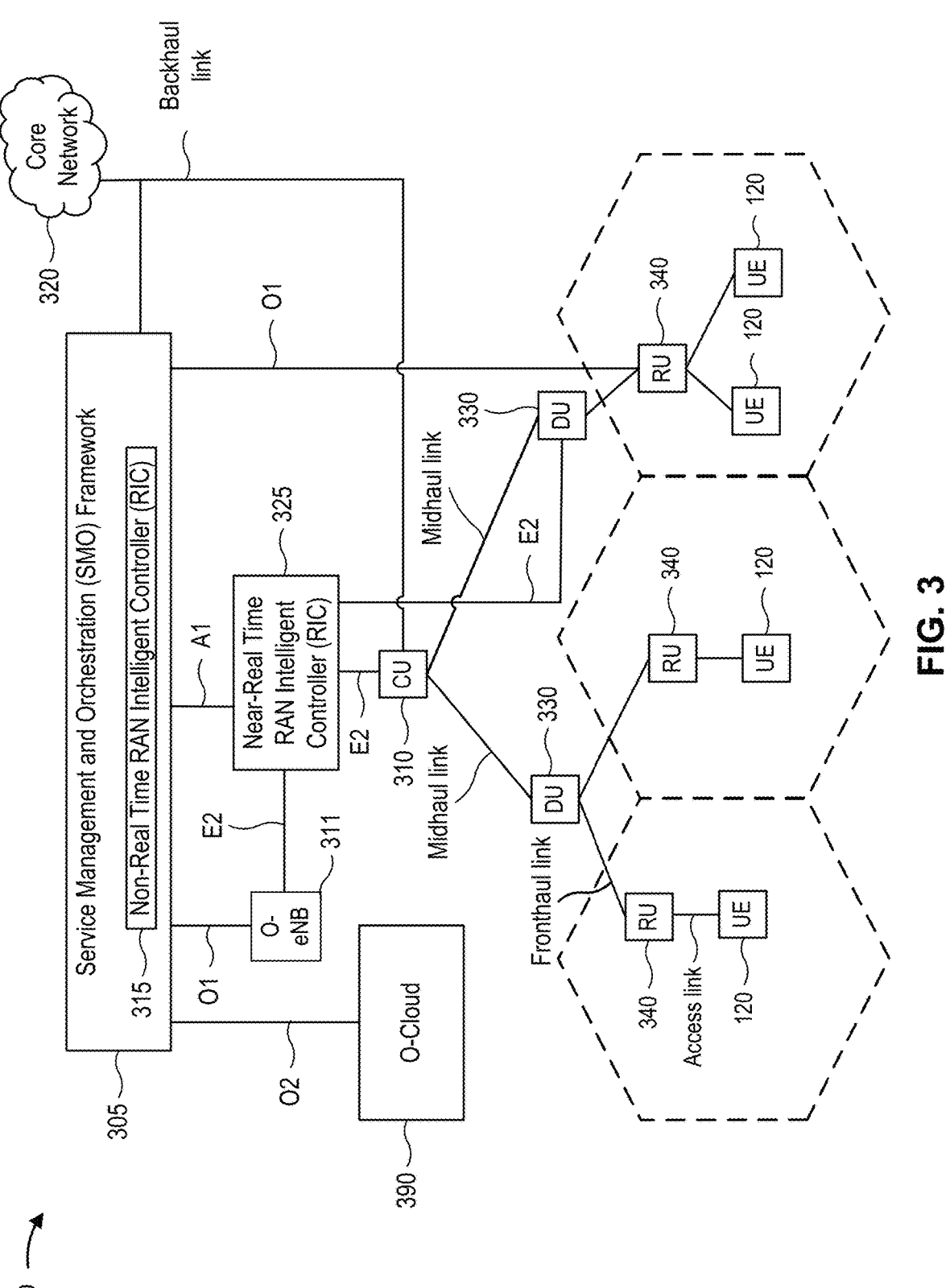
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs

330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more RF access links. In some aspects, the UE 120 may be simultaneously served by multiple RUs 340. The DUs 330 and the RUs 340 may also be referred to as "O-RAN DUs (O-DUs)" and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
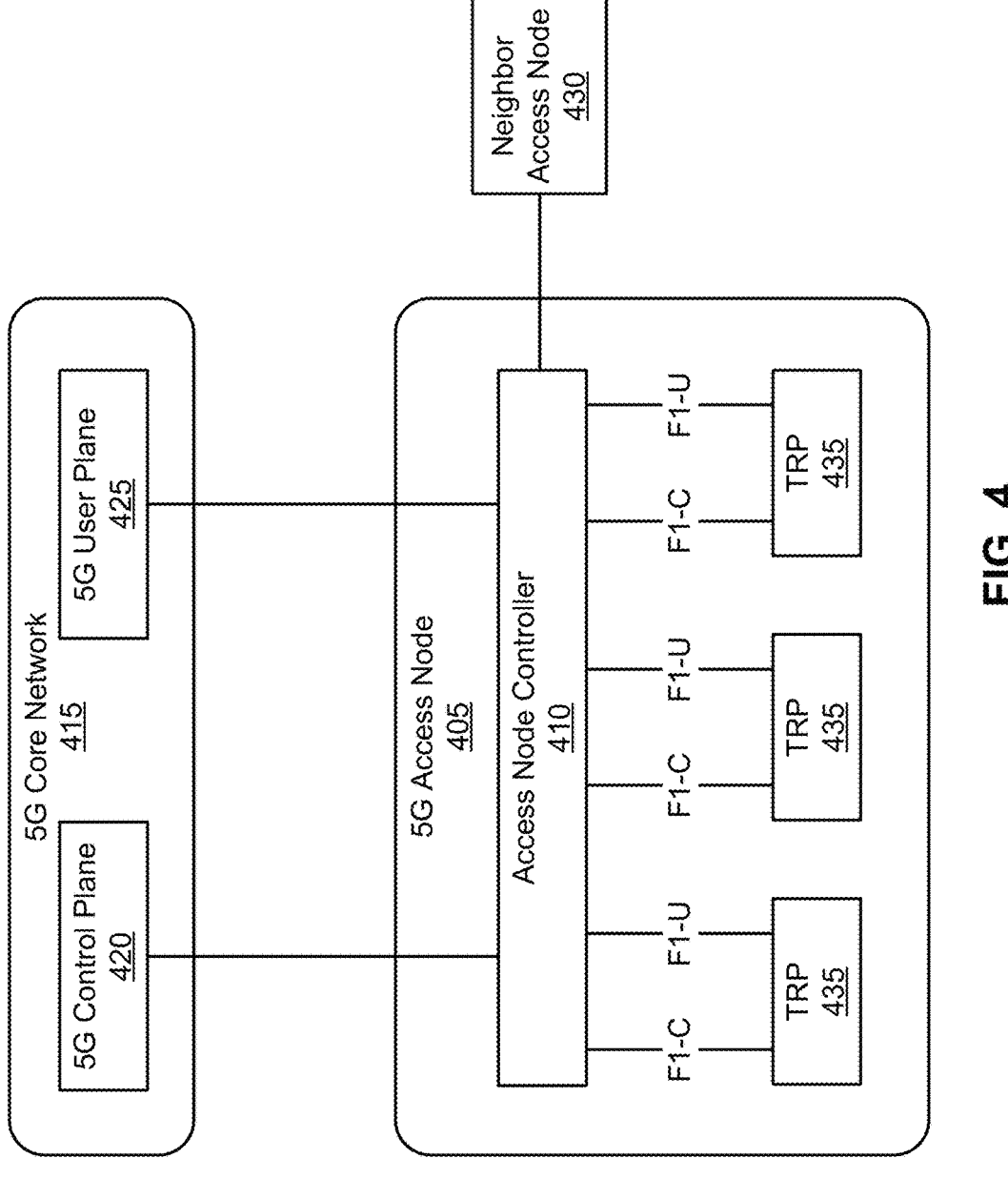
FIG. 4 illustrates an example logical architecture of a distributed random access network, in accordance with the present disclosure.

FIG. 4 illustrates an example logical architecture of a distributed RAN 400, in accordance with the present disclosure.

A 5G access node 405 may include an access node controller 410. The access node controller 410 may be a CU of the distributed RAN 400. In some aspects, a backhaul interface to a 5G core network 415 may terminate at the access node controller 410. The 5G core network 415 may include a 5G control plane component 420 and a user plane component 425 (e.g., a 5G gateway), and the backhaul interface for one or both of the 5G control plane and the 5G user plane may terminate at the access node controller 410. Additionally, or alternatively, a backhaul interface to one or more neighbor access nodes 430 (e.g., another 5G access node 405 and/or an LTE access node) may terminate at the access node controller 410.

The access node controller 410 may include and/or may communicate with one or more TRPs 435 (e.g., via an F1 Control (F1-C) interface and/or an F1 User (F1-U) interface). A TRP 435 may be a DU of the distributed RAN 400. In some aspects, a TRP 435 may correspond to a base station 110 described above in connection with FIG. 1. For example, different TRPs 435 may be included in different base stations 110. Additionally, or alternatively, multiple TRPs 435 may be included in a single base station 110. In some aspects, a base station 110 may include a CU (e.g., access node controller 410) and/or one or more DUs (e.g., one or more TRPs 435). In some cases, a TRP 435 may be referred to as a cell, a panel, an antenna array, or an array.

A TRP 435 may be connected to a single access node controller 410 or to multiple access node controllers 410. In some aspects, a dynamic configuration of split logical functions may be present within the architecture of distributed RAN 400. For example, a PDCP layer, an RLC layer, and/or a MAC layer may be configured to terminate at the access node controller 410 or at a TRP 435.

In some aspects, multiple TRPs 435 may transmit communications (e.g., the same communication or different communications) in the same transmission time interval (TTI) (e.g., a slot, a mini-slot, a subframe, or a symbol) or different TTIs using different quasi-co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 435 may be configured to individually (e.g., using dynamic selection) or jointly (e.g., using joint transmission with one or more other TRPs 435) serve traffic to a UE 120.

As indicated above, FIG. 4 is provided as an example. Other examples may differ from what was described with regard to FIG. 4.

Figure 5:
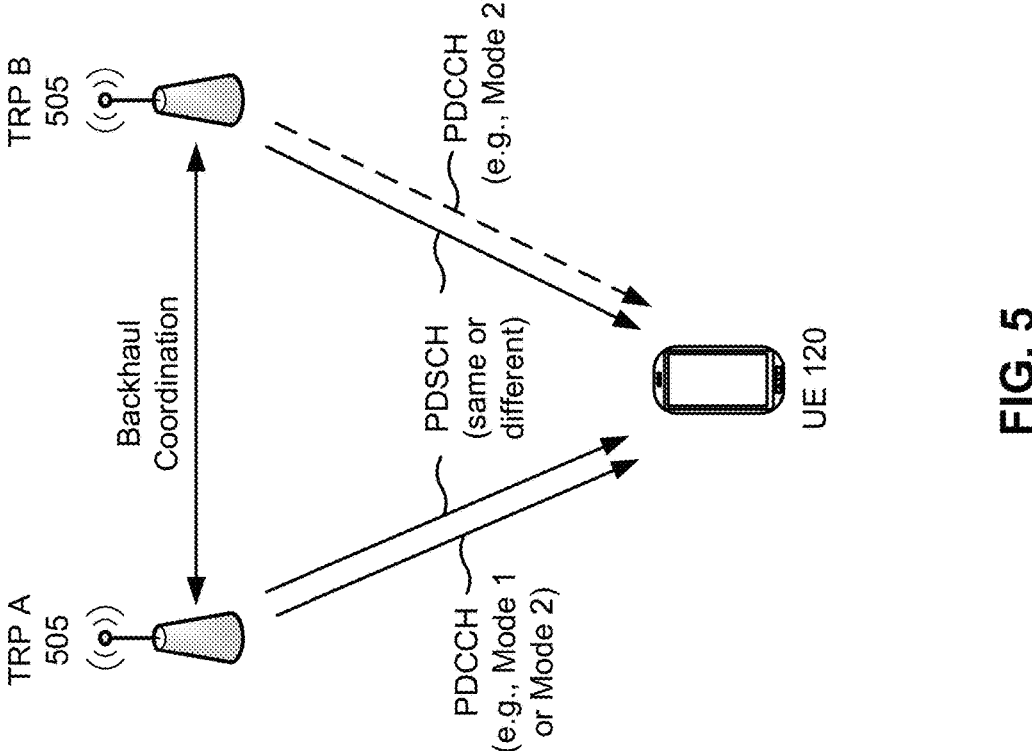
FIG. 5 is a diagram illustrating an example of multiple transmit receive points, in accordance with the present disclosure.

FIG. 5 is a diagram illustrating an example 500 of multiple TRP (multi-TRP) communication (sometimes referred to as multi-panel communication), in accordance with the present disclosure. As shown in FIG. 5, multiple TRPs 505 may communicate with the same UE 120. A TRP 505 may correspond to a TRP 435 described above in connection with FIG. 4.

The multiple TRPs 505 (shown as TRP A and TRP B) may communicate with the same UE 120 in a coordinated manner (e.g., using coordinated multipoint transmissions) to improve reliability and/or increase throughput. The TRPs 505 may coordinate such communications via an interface between the TRPs 505 (e.g., a backhaul interface and/or an access node controller 410). The interface may have a smaller delay and/or higher capacity when the TRPs 505 are co-located at the same base station 110 (e.g., when the TRPs 505 are different antenna arrays or panels of the same base station 110), and may have a larger delay and/or lower capacity (as compared to co-location) when the TRPs 505 are located at different base stations 110. The different TRPs 505 may communicate with the UE 120 using different QCL relationships (e.g., different TCI states), different DMRS ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 505 (e.g., TRP A and TRP B) may transmit communications to the UE 120 on the same PDSCH. For example, a communication may be transmitted using a single codeword with different spatial layers for different TRPs 505 (e.g., where one codeword maps to a first set of layers transmitted by a first TRP 505 and maps to a second set of layers transmitted by a second TRP 505). As another example, a communication may be transmitted using multiple codewords, where different codewords are transmitted by different TRPs 505 (e.g., using different sets of layers). In either case, different TRPs 505 may use different QCL relationships (e.g., different TCI states) for different DMRS ports corresponding to different layers. For example, a first TRP 505 may use a first QCL relationship or a first TCI state for a first set of DMRS ports corresponding to a first set of layers, and a second TRP 505 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 505, and a second PDCCH may schedule a second codeword to be transmitted by a second TRP 505. Furthermore, first DCI (e.g., transmitted by the first TRP 505) may schedule a first PDSCH communication associated with a first set of DMRS ports with a first QCL relationship (e.g., indicated by a first TCI state) for the first TRP 505, and second DCI (e.g., transmitted by the second TRP 505) may schedule a second PDSCH communication associated with a second set of DMRS ports with a second QCL relationship (e.g., indicated by a second TCI state) for the second TRP 505. In this case, DCI (e.g., having DCI format 1_0 or DCI format 1_1) may indicate a corresponding TCI state for a TRP 505 corresponding to the DCI. The TCI field of a DCI indicates the corresponding TCI state (e.g., the TCI field of the first DCI indicates the first TCI state and the TCI field of the second DCI indicates the second TCI state).

As indicated above, FIG. 5 is provided as an example. Other examples may differ from what is described with respect to FIG. 5.

Figure 6:
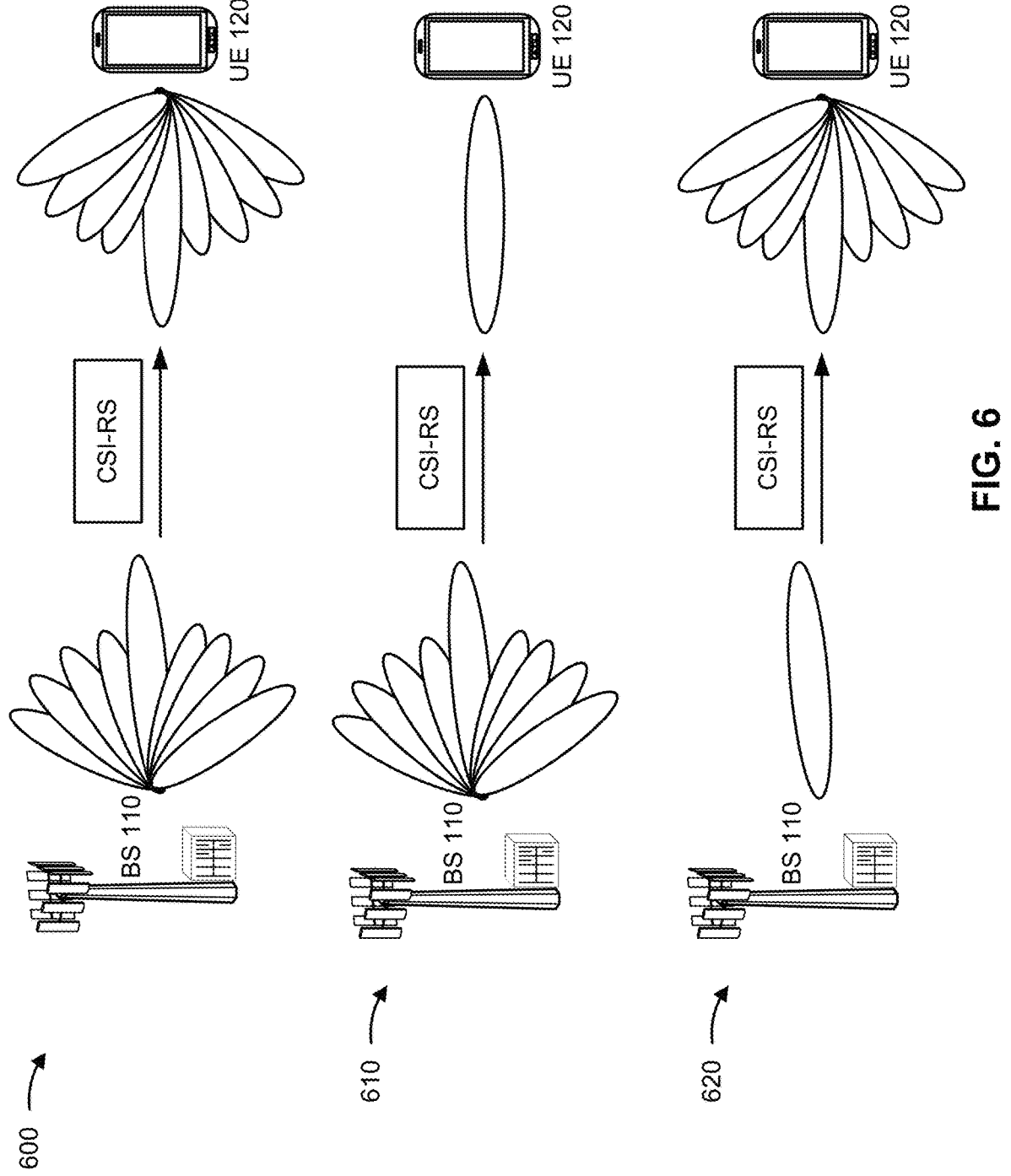
FIG. 6 is a diagram illustrating examples of channel state information (CSI) reference signal (CSI-RS) beam management procedures, in accordance with the present disclosure.

FIG. 6 is a diagram illustrating examples 600, 610, and 620 of CSI-RS beam management procedures, in accordance with the present disclosure. As shown in FIG. 6, examples 600, 610, and 620 include a UE 120 in communication with a network entity (e.g., base station 110) in a wireless network (e.g., wireless network 100). However, the devices shown in FIG. 6 are provided as examples, and the wireless network may support communication and beam management between other devices (e.g., between a UE 120 and a base station 110 or TRP, between a mobile termination node and a control node, between an IAB child node and an IAB parent node, and/or between a scheduled node and a scheduling node). In some aspects, the UE 120 and the base station 110 may be in a connected state (e.g., an RRC connected state).

As shown in FIG. 6, example 600 may include a base station 110 and a UE 120 communicating to perform beam management using CSI-RSs. Example 600 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam search procedure. As shown in FIG. 6 and example 600, CSI-RSs may be configured to be transmitted from the base station 110 to the UE 120. The CSI-RSs may be configured to be periodic (e.g., using RRC signaling), semi-persistent (e.g., using MAC control element (MAC CE) signaling), and/or aperiodic (e.g., using DCI).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same RS resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 600 has been described in connection with CSI-RSs, the first beam management process may also use synchronization signal blocks (SSBs) for beam management in a similar manner as described above.

As shown in FIG. 6, example 610 may include a base station 110 and a UE 120 communicating to perform beam management using CSI-RSs. Example 610 depicts a second beam management procedure (e.g., P2 CSI-RS beam management). The second beam management procedure may be referred to as a beam refinement procedure, a base station beam refinement procedure, a TRP beam refinement procedure, and/or a transmit beam refinement procedure. As shown in FIG. 6 and example 610, CSI-RSs may be configured to be transmitted from the base station 110 to the UE 120. The CSI-RSs may be configured to be aperiodic (e.g., using DCI). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120.

As shown in FIG. 6, example 620 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 6 and example 620, one or more CSI-RSs may be configured to be transmitted from the base station 110 to the UE 120. The CSI-RSs may be configured to be aperiodic (e.g., using DCI). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams).

As indicated above, FIG. 6 is provided as an example of beam management procedures. Other examples of beam management procedures may differ from what is described with respect to FIG. 6. For example, the UE 120 and the base station 110 may perform the third beam management procedure before performing the second beam management procedure, and/or the UE 120 and the base station 110 may perform a similar beam management procedure to select a UE transmit beam.

Figure 7:
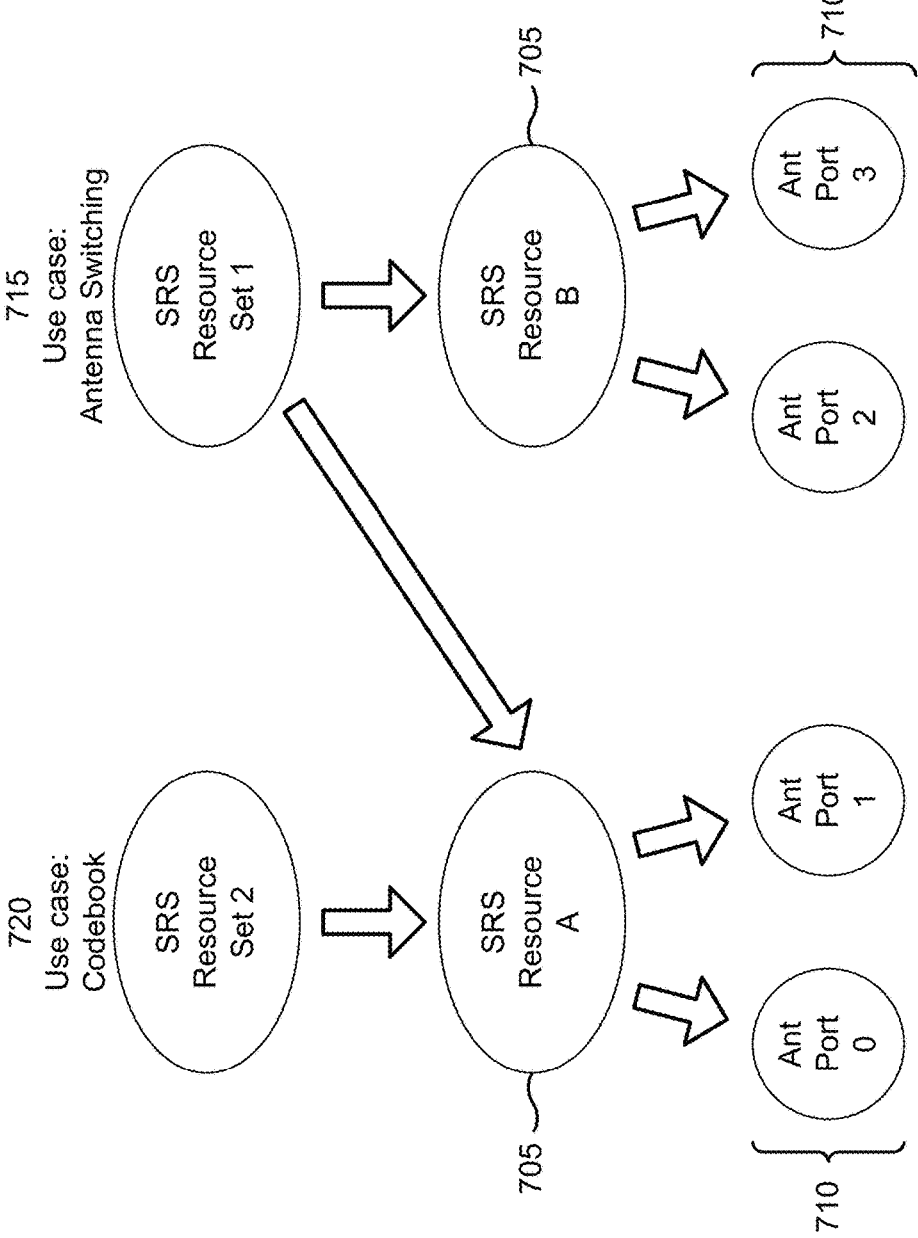
FIG. 7 is a diagram illustrating an example of sounding reference signal (SRS) resource sets, in accordance with the present disclosure.

FIG. 7 is a diagram illustrating an example 700 of SRS resource sets, in accordance with the present disclosure.

A UE 120 may be configured with one or more SRS resource sets to allocate resources for SRS transmissions by the UE 120. For example, a configuration for SRS resource sets may be indicated in an RRC message (e.g., an RRC configuration message or an RRC reconfiguration message). As shown by reference number 705, an SRS resource set may include one or more resources (e.g., shown as SRS resources), which may include time resources and/or frequency resources (e.g., a slot, a symbol, a resource block, and/or a periodicity for the time resources).

As shown by reference number 710, an SRS resource may include one or more antenna ports on which an SRS is to be transmitted (e.g., in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some aspects, the configuration for an SRS resource set may indicate a use case (e.g., in a usage information element) for the SRS resource set. For example, an SRS resource set may have a use case of antenna switching, codebook, non-codebook, or beam management.

An antenna switching SRS resource set may be used to indicate downlink CSI with reciprocity between an uplink and downlink channel. For example, when there is reciprocity between an uplink channel and a downlink channel, a base station 110 may use an antenna switching SRS (e.g., an SRS transmitted using a resource of an antenna switching SRS resource set) to acquire downlink CSI (e.g., to determine a downlink precoder, a rank, or an MCS to be used to communicate with the UE 120).

A codebook SRS resource set may be used to indicate uplink CSI when a base station 110 indicates an uplink precoder to the UE 120. For example, when the base station 110 is configured to indicate an uplink precoder to the UE 120 (e.g., using a precoder codebook), the base station 110 may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the base station 110). In some aspects, virtual ports (e.g., a combination of two or more antenna ports) with a maximum transmit power may be supported at least for a codebook SRS.

A non-codebook SRS resource set may be used to indicate uplink CSI when the UE 120 selects an uplink precoder (e.g., instead of the base station 110 indicated an uplink precoder to be used by the UE 120). For example, when the UE 120 is configured to select an uplink precoder, the base station 110 may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be indicated to the base station 110). A beam management SRS resource set may be used for indicating CSI for millimeter wave communications.

An SRS resource can be configured as periodic (P), semi-persistent (SP) (sometimes referred to as semi-persistent scheduling (SPS)), or aperiodic (AP). A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated, and may not be dynamically activated or deactivated. A semi-persistent SRS resource may also be configured via a configuration message that indicates a periodicity and a slot offset for the semi-persistent SRS resource, and may be dynamically activated and deactivated (e.g., using DCI or a MAC CE). An aperiodic SRS resource may be triggered dynamically, such as via DCI (e.g., UE-specific DCI or group common DCI) or a MAC CE.

In some aspects, the UE 120 may be configured with a mapping between SRS ports (e.g., antenna ports) and corresponding SRS resources. The UE 120 may transmit an SRS on a particular SRS resource using an SRS port indicated in the configuration. In some aspects, an SRS resource may span N adjacent symbols within a slot (e.g., where N equals 1, 2, or 4). The UE 120 may be configured with X SRS ports (e.g., where X≤4). In some aspects, each of the X SRS ports may mapped to a corresponding symbol of the SRS resource and used for transmission of an SRS in that symbol.

As shown in FIG. 7, in some aspects, different SRS resource sets indicated to the UE 120 (e.g., having different use cases) may overlap (e.g., in time and/or in frequency, such as in the same slot). For example, as shown by reference number 715, a first SRS resource set (e.g., shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1 and may be transmitted in SRS Resource B (e.g., a second time-frequency resource) using antenna port 2 and antenna port 3.

As shown by reference number 720, a second SRS resource set (e.g., shown as SRS Resource Set 2) may be a codebook use case. As shown, this example codebook SRS resource set includes only the first SRS resource (shown as SRS Resource A). Thus, codebook SRSs may be transmitted in SRS Resource A (e.g., the first time-frequency resource) using antenna port 0 and antenna port 1. In this case, the UE 120 may not transmit codebook SRSs in SRS Resource B (e.g., the second time-frequency resource) using antenna port 2 and antenna port 3.

SRS resource sets help to simplify activation (for semi-persistent SRS) and DCI triggering (for aperiodic SRS) because multiple resources can be activated or triggered simultaneously. A resource type (RRC configuration per SRS resource set) may be configured as aperiodic, semi-persistent, or periodic, which determines the time domain behavior. Usage for an SRS resource set may be configured as {beamManagement, codebook, nonCodebook, antennaSwitching}.

Antenna switching may be used for downlink CSI acquisition. Once the network entity obtains a channel (through SRS) corresponding to each receive antenna of the UE, the network entity may calculate a PDSCH rank (number of layers), precoding, a CQI, and/or an MCS.

As indicated above, FIG. 7 is provided as an example. Other examples may differ from what is described with regard to FIG. 7.

Figure 8:
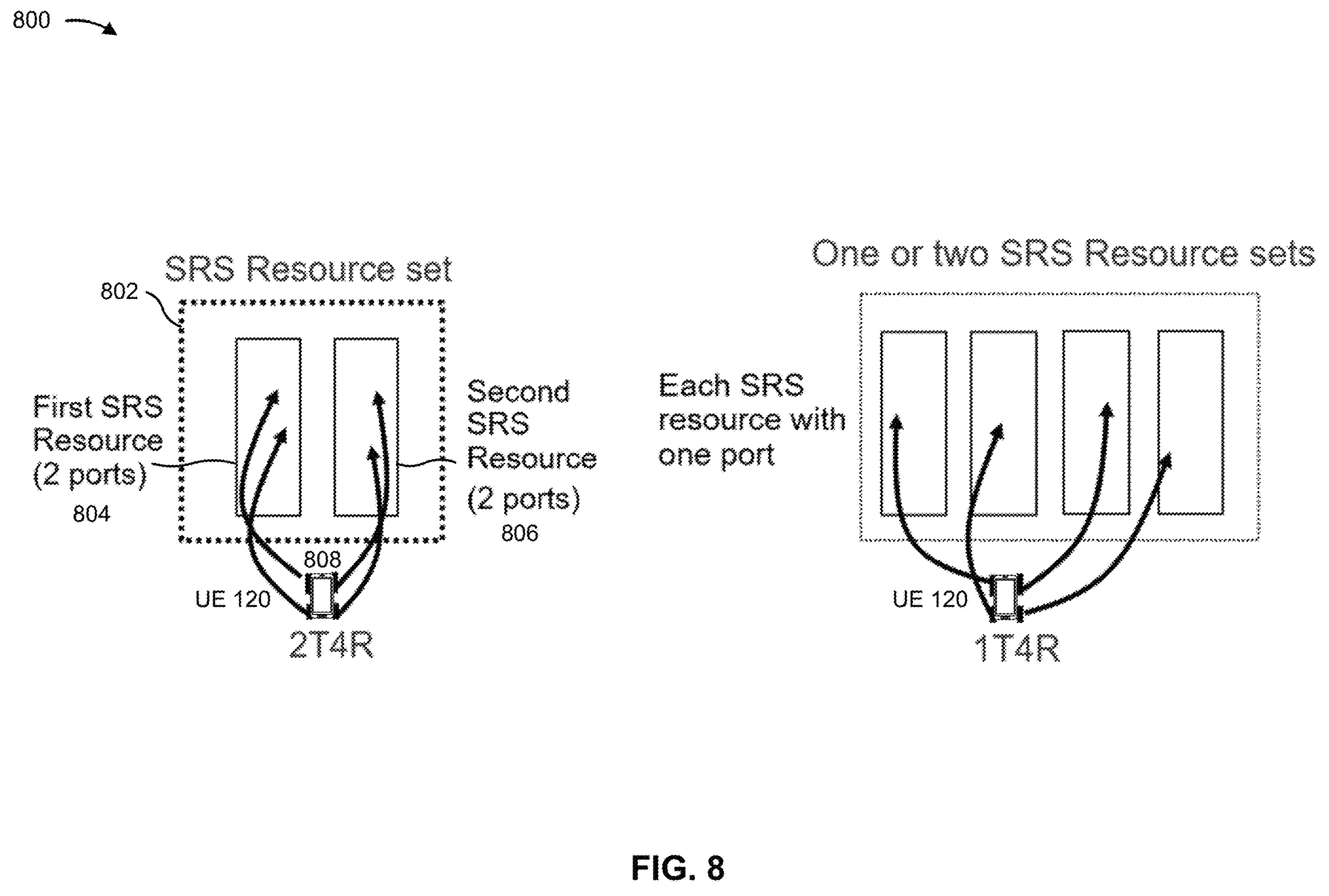

FIG. 8 is a diagram illustrating an example 800 of SRS resources, in accordance with the present disclosure.

For downlink transmission, a network entity (e.g., base station 110) may obtain channel state information by requesting an SRS. For time-division duplexing (TDD), where channel reciprocity can be assumed, if the quantity of transmit (Tx) antennas x is equal to the quantity of receive (Rx) antennas y, a UE (e.g., a UE 120) may represent these quantities as xTyR, where x=y. In this case, one SRS resource with x=y SRS ports can be used for channel sounding.

If the quantity of transmit antennas is smaller than the quantity of receive antennas (x<y), the UE may switch SRS antennas as all y antennas are to be sounded for downlink CSI acquisition, but the UE can transmit an SRS resource with up to only x ports at a time (sounding only x out of y antennas).

Note that power control parameters (e.g., P0, alpha, path loss RS, closed loop index) may be configured per SRS resource set in 3GPP Release 15 or 16 (and not per SRS resource). When two SRS resource sets are used for antenna switching (e.g., for 1T4R in case of aperiodic SRSs), the two SRS resource sets are expected to be configured with the same power control parameters.

The UE may indicate one of xTyR antennas when the UE is capable of x transmit antennas and y receive antennas. Example 800 shows an SRS resource set 802 with a first SRS resource 804 and a second SRS resource 806. A UE may have 4 receive antennas 808 but can only transmit with up to 2 SRS ports per SRS resource (e.g., simultaneously). Example 800 also shows 2T4R antennas for the first SRS resource 804 and the second SRS resource 806 (2 ports each) transmitted in different symbols. The SRS port pair of the second SRS resource 806 may be associated with a different UE antenna port pair than the SRS port pair of the first SRS resource 804.

Example 800 also shows 1T4R antennas with one port each for 4 SRS resources for periodic or semi-persistent SRSs. For aperiodic SRSs, there may be 2 SRS resource sets (2+2 or 1+3) that both use the same power control. The SRS resources may be in different slots.

A UE may use a precoded SRS for downlink CSI acquisition for SRS coverage enhancement and for SRS overhead reduction. The coverage enhancement may be due to the fact that SRS is beamformed or precoded. The SRS overhead reduction (SRS capacity enhancement) may be due to the total quantity of SRS ports that are sounded being reduced to a quantity of PDSCH layers (from the quantity of receive antennas). In current specifications, the total quantity of ports for SRS for downlink CSI acquisition is the same as the quantity of UE receive antennas. For beamformed SRS, through proper SRS precoding, the total quantity of SRS ports can be reduced to the quantity of PDSCH layers, while the channel information required for downlink precoding can be obtained. For example, if the UE has 4 receive antennas and assuming 4T4R, one SRS resource with 4 ports may be needed to sound each of the 4 receive antennas in legacy. But with precoded SRS, assuming that the precoding matrix is 4×2, only 2 SRS ports are needed, where 2 here corresponds to the maximum quantity of PDSCH layers.

One possible precoder for beamformed SRS is the U matrix (left-singular vector) corresponding to the singular value decomposition (SVD) of the downlink channel. In order to obtain the channel at the UE side (to calculate precoding for SRS), CSI-RS measurements are used. Coherent joint transmission (CJT) may be used for PDSCH, where multiple TRPs transmit PDSCH communications coherently across different antennas of TRPs. Therefore, multiple CSI-RS resources (each transmitted from a TRP) may be needed for the UE to obtain the downlink channel. The precoding for SRS may be determined based on an aggregated downlink channel from multiple TRPs.

As indicated above, FIG. 8 is provided as an example. Other examples may differ from what is described with regard to FIG. 8.

Figure 9:
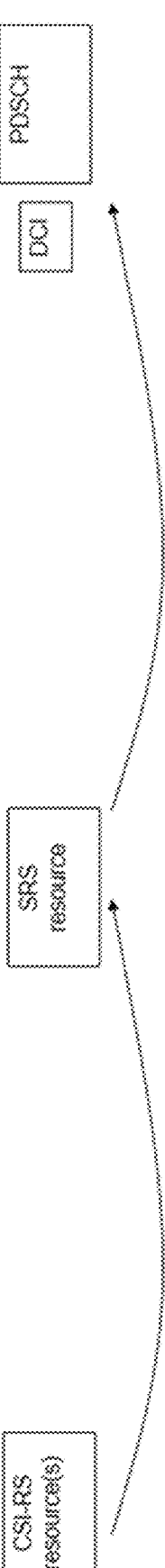
FIG. 9 is a diagram illustrating an example of SRS precoding for downlink CSI acquisition, in accordance with the present disclosure.

FIG. 9 is a diagram illustrating an example 900 of SRS precoding for downlink CSI acquisition, in accordance with the present disclosure.

In an example, if a UE has 4 transmit antennas and 4 receive antennas, and one or more TRPs have in total N antennas, the downlink channel H may be 4×N. This corresponds to 4T4R, which means an SRS resource with 4 ports is used to sound all of the 4 receive antennas. With SRS precoding, assuming that the precoding matrix is 4×2 (the first two columns of the U matrix after SVD), the SRS has 2 ports where each SRS port is transmitted from all 4 physical antennas at the UE based on the precoding. The network entity may obtains a downlink channel H' that is now 2×N. However, the V matrix (right-singular vector), which is used for downlink precoding by the network entity, is generally the same for both H and H'. The network entity may determine the precoding (V matrix) based on H'. However, the rank of the PDSCH is limited to the actual number of SRS ports (2) in this case.

Example 900 shows a CSI-RS resource that is associated with an SRS resource, which is used for obtaining downlink precoding, a rank, a CQI, or an MCS. Then, a DCI may schedule a PDSCH communication and indicate the parameters associated with the PDSCH communication (e.g., a rank, an MCS). Finally, the network entity may transmit the PDSCH communication using the obtained downlink precoding, rank, CQI, or MCS. The UE may obtain the downlink channel H (4×N) based on a CSI-RS measurement. The UE may calculate precoding that is to be applied to SRS based on H. This SRS precoding may translate 4 ports to 2 SRS ports, where each SRS port is transmitted from all 4 physical antennas at the UE based on the corresponding precoding.

The network entity may obtain the downlink channel H' (2×N) based on an SRS transmitted with 2 ports. The network entity may calculate precoding (to be applied to PDSCH communications) based on the downlink channel H'. The network entity may schedule a PDSCH communication via DCI and transmit the PDSCH communication using the calculated SRS precoding.

For SRS precoding, the rank r (and hence number of SRS ports) may be selected at the UE or indicated by the network entity. If the decision is at the UE, it has not been specified how to determine SRS antenna port numbers, a comb offset, and/or a cyclic shift for each SRS port. It has also not been specified how the network entity receives the precoded SRS. When x=y, such precoding is possible. The UE is capable of transmitting from all of the x=y antennas at the same time. The actual number of SRS antenna ports may be r≤x=y, and the UE may transmit from all transmit antennas (x=y) on each of the r SRS ports. Effectively, the SRS configuration may become equivalent to rTrR as the SRS resource has r actual ports. However, when x<y, such precoding may not be possible. A precoding cannot be applied across all y antennas since the UE cannot transmit from more than x antennas at a given time.

As indicated above, FIG. 9 is provided as an example. Other examples may differ from what is described with regard to FIG. 9.

Figure 10:
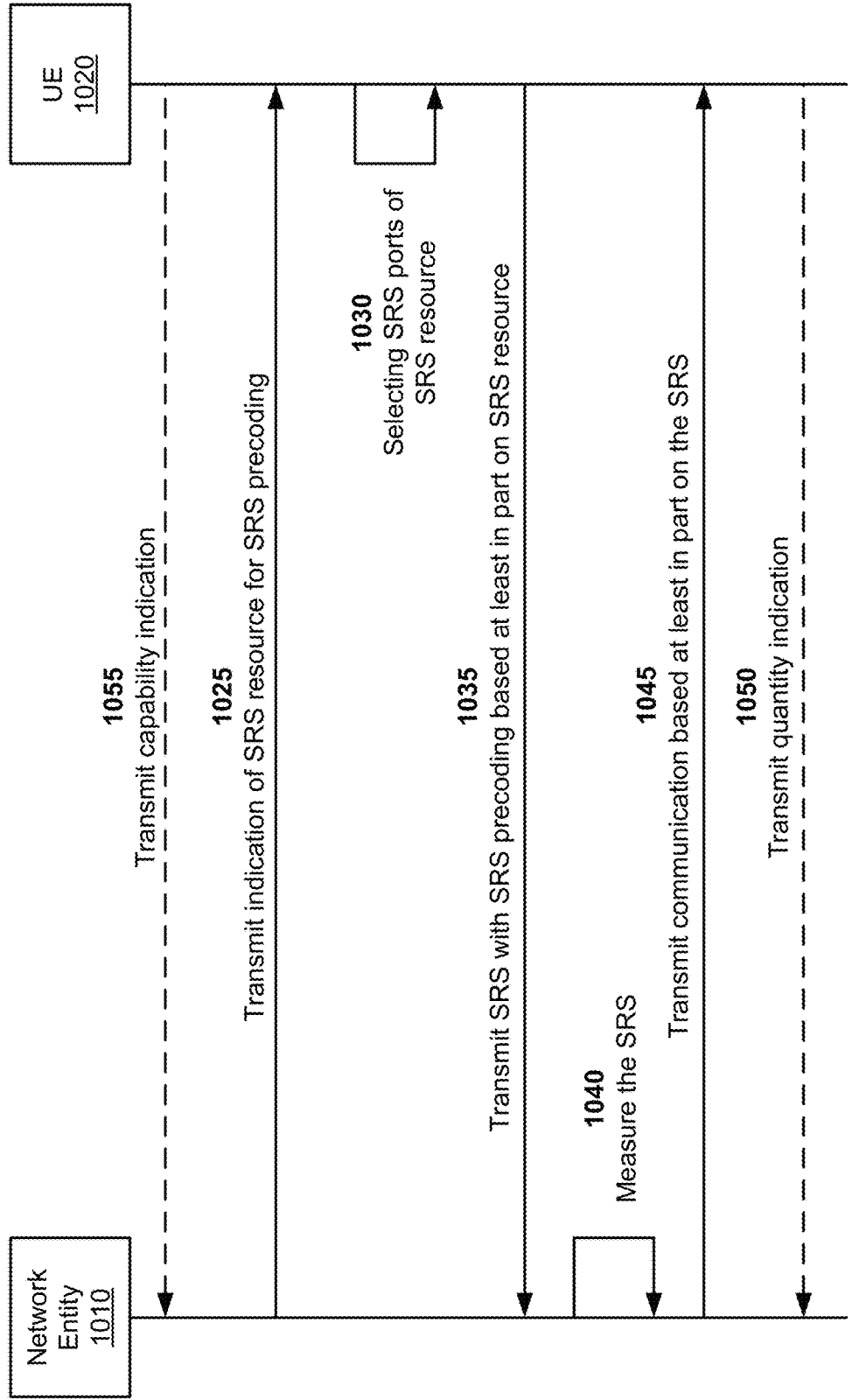
FIG. 10 is a diagram illustrating an example of SRS port selection, in accordance with the present disclosure.

FIG. 10 is a diagram illustrating an example 1000 of SRS port selection, in accordance with the present disclosure. As shown in FIG. 10, a network entity 1010 (e.g., base station 110) and a UE 1020 (e.g., a UE 120) may communicate with one another via a wireless network (e.g., wireless network 100).

According to various aspects described herein, when the UE 1020 is configured with SRS precoding for downlink CSI acquisition, the configured quantity of SRS ports p for an SRS resource corresponds to a maximum rank which is equal to or smaller than the quantity of receive antennas y at the UE, or p≤y. As shown by reference number 1025, the network entity 1010 may transmit an indication of an SRS resource for SRS precoding. The SRS precoding may be based at least in part on a downlink measurement of a reference signal (e.g., CSI-RS) and/or SRS ports of the UE 1020.

In some aspects, the actual quantity of SRS ports r may always be the same as the configured number of SRS ports, or r=p. In this case, selection of the rank is not performed by the UE 1020. Instead, the UE 1020 may determine a precoding given the configured rank, which is the same as the configured quantity of SRS ports, based at least in part on one or more CSI-RS resources.

In some aspects, the actual quantity of SRS ports r is selected by the UE 1020 based at least in part on one or more CSI-RS resources. In this case, selection of the rank is performed by the UE 1020. The actual quantity of SRS ports is equal to or smaller than the configured quantity of SRS ports for the UE, or r≤p. If the actual quantity is smaller than the configured number (r<p), a subset of the SRS ports of the SRS resource may be selected. As a first option, the UE 1020 may select the first r port numbers out of p port numbers. As a second option, the UE 1020 may select even (or odd) port numbers when r=p/2.

As shown by reference number 1030, the UE 1020 may select SRS ports of the SRS resource. The UE 1020 may select one or more SRS ports such that a quantity of the one or more SRS ports is equal to or less than the total quantity of configured SRS ports. The quantity of the one or more SRS ports may be based at least part on one or more CSI-RS resources. The UE 1020 may select the quantity of the one or more SRS ports to be equal to the total quantity of configured SRS ports. The UE 1020 may select first SRS port numbers out of SRS port numbers for the configured SRS ports if the quantity of the one or more SRS ports is less than the total quantity of configured SRS ports. The UE 1020 may select even SRS port numbers (or odd SRS port numbers) out of SRS port numbers for the total quantity of configured SRS ports if the quantity of the one or more SRS ports is half of the total quantity of configured SRS ports As shown by reference number 1035, the UE 1020 may transmit an SRS with SRS precoding based at least in part on the SRS resource. The UE 1020 may transmit the SRS using the one or more SRS ports. The UE 1020 may transmit the SRS using an SRS sequence that is based at least in part on the quantity of the one or more SRS ports. As shown by reference number 1040, the network entity 1010 may measure the SRS. As shown by reference number 1045, the network entity 1010 may transmit a communication based at least in part on the SRS.

By receiving an indication of an SRS resource for SRS precoding that is based at least in part on a downlink measurement, where a total quantity of configured SRS ports for transmission is less than or equal to a quantity of receive antennas configured at the UE, the UE may apply precoding when the total quantity of configured SRS ports for transmission is less than or equal to the quantity of receive antennas configured at the UE. As a result, the UE may more effectively transmit an SRS and measurements of the SRS may assist with improved communications. Improved communications reduce latency and conserver signaling resources.

A comb offset and a cyclic shift of each port of an SRS resource may be a function of a quantity of SRS ports of the SRS resource. When the UE 1020 selects the actual quantity of SRS ports that can be fewer than the configured quantity of SRS ports, it has not been specified how the UE 1020 is to select the comb offset and/or the cyclic shift of each actual SRS port. In some aspects, the comb offset and the cyclic shift of each actual SRS port may be based at least in part on the actual quantity of SRS ports. For example, the SRS resource may be configured with p=4 ports, with an initial cyclic shift of 0 and comb spacing of 4 (which has 12 cyclic shifts). If the UE 1020 selects the actual quantity of SRS ports as r=4, the cyclic shift of SRS ports may be {0, 3, 6, 9}, and ports 1000 and 1002 may be in a first comb offset. Ports 1001 and 1003 may be in another comb offset (this follows an existing rule for 4 ports). If the UE 1020 selects the actual number of SRS ports as r=2, the cyclic shift of SRS ports may be {0, 6} and both ports may be in the same comb offset (this follows an existing rule for 2 ports).

In some aspects, the comb offset and the cyclic shift of each actual SRS port may be based at least in part on the configured quantity of SRS ports and based at least in part on which SRS port numbers are selected. For example, an SRS resource may be configured with p=4 ports, with an initial cyclic shift of 0 and a comb spacing of 4 (which has 12 cyclic shifts). If the UE 1020 selects the actual number of SRS ports as r=4, the cyclic shift of SRS ports may be {0, 3, 6, 9}, and ports 1000 and 1002 may be in a first comb offset. Ports 1001 and 1003 may be in another comb offset.

If the UE 1020 selects the actual quantity of SRS ports as r=2, the cyclic shift and the comb offset of SRS ports may remain the same based at least in part on p=4 (the UE 1020 may not determine the comb offset or the cyclic shift based on r=2). If port numbers 1000 and 1001 are selected, the SRS ports may have a cyclic shift of {0, 3} and may be in different comb offsets. If port numbers 1000 and 1002 are selected, the SRS ports may have a cyclic shift of {0, 6} and may be in the same comb offset.

Given that the UE 1020 may select the actual quantity of SRS ports, it has not been specified how the network entity 1010 receives the SRS without knowing the actual quantity of SRS ports. In some aspects, the network entity 1010 may try multiple hypotheses on the actual quantity of SRS ports (blind detection). This option is transparent to the UE 1020. In some aspects, an SRS sequence is a function of the selected actual quantity of SRS ports. For example, if the UE 1020 selects r=1, the UE 1020 may use a first SRS sequence for transmitting the 1 port SRS. If the UE 1020 selects r=2, the UE 1020 may use a second SRS sequence for transmitting the 2 port SRS. This option is no longer transparent to the UE 1020 (as the UE 1020 indicates the selected actual number of SRS ports through SRS sequence), but still requires the network entity 1010 to try multiple hypotheses. However, the performance of blind detection at the network entity 1010 can be improved.

In some aspects, the UE 1020 may separately indicate a selected actual quantity of SRS ports through uplink control information (UCI) or a MAC CE on a physical uplink control channel (PUCCH) or a physical uplink shared channel (PUSCH). This quantity indication may be valid for one or more instances of the SRS resource. When the SRS resource is periodic or semi-persistent, the UE 1020 may transmit the quantity indication before each instance of the SRS resource. In some aspects, the quantity indication may be valid for all future instances of the SRS resource until another indication indicates a different selected actual quantity of SRS ports. There may be a timeline or a minimum time duration defined between the time of transmitting the quantity indication and the time of an instance of the SRS resource that is transmitted with the indicated actual quantity of SRS ports. The time duration may be expected by the network entity 1010 in order to decode the indication before the network entity 1010 can receive the SRS resource. The periodicity or frequency of the indication may be a function of the periodicity or frequency of the associated one or more CSI-RS resources that are used by the UE 1020 to determine the actual quantity of SRS ports (as well as the SRS precoding).

Accordingly, in some aspects, as shown by reference number 1050, the UE 1020 may transmit a quantity indication of the quantity of the one or more SRS ports. The UE 1020 may transmit the quantity indication before each of multiple instances of the SRS resource. The UE 1020 may transmit the quantity indication for multiple instances of the SRS resource. The UE 1020 may transmit the quantity of the one or more SRS ports based at least in part on a specified time duration between the indication and an instance of the SRS resource. The UE 1020 may transmit the quantity of the one or more SRS ports based at least in part on a specified periodicity associated with one or more CSI-RS resources.

In some aspects, the UE 1020 may be configured with SRS precoding for downlink CSI acquisition only if the UE indicates a capability of xTyR with x=y through UE capability supportedSRS-TxPortSwitch. That is, when x<y in the reported UE capability of xTyR, it is implied that the UE 1020 is not capable of SRS precoding for antenna switching. The UE 1020 may indicate a new UE capability on whether the UE 1020 supports SRS precoding for downlink CSI acquisition.

As shown by reference number 1055, the UE 1020 may transmit a capability indication of a UE capability of the UE 1020 of whether the UE 1020 supports SRS precoding for downlink CSI acquisition, or of whether the UE 1020 can be configured with a quantity of transmit antennas that equals a quantity of received antennas of the UE. The UE 1020 may transmit the capability indication with capability information dedicated to SRS precoding. The capability indication may further indicate a maximum quantity for one or more SRS ports of the SRS resource.

In some aspects, the xTyR capability is a new UE capability that is specific to SRS precoding and separately indicated from any other capability reporting (e.g., separate from the existing UE capability supportedSRS-TxPortSwitch). Alternatively, or additionally, the xTyR capability may be with existing capability reporting irrespective of SRS precoding. In either alternative, the UE 1020 may further indicate a maximum value of r, which is the value of p corresponding to the maximum quantity of SRS ports after precoding. Then, the SRS configuration may correspond to pTpR (and the actual SRS transmission is following rTrR), where one SRS resource is used with p ports (actual quantity of SRS ports r can be smaller than p). The UE 1020 may indicate that the UE 1020 is capable of xTyR (e.g., 2T4R) in general, but when SRS precoding is used, the UE 1020 is not capable of that xTyR (e.g., the UE 1020 is not capable of 2T4R and is only capable of 2T2R or 4T4R for SRS precoding).

The UE 1020, after indicating this capability, may receive a corresponding configuration for SRS precoding for downlink CSI acquisition. When the actual quantity of SRS antenna ports is r≤p≤x=y, the UE 1020 may transmit from all physical transmit antennas (x=y) on each of the r SRS ports. Note that aspects described herein are applicable to both a single TRP and multiple TRPs.

As indicated above, FIG. 10 is provided as an example. Other examples may differ from what is described with respect to FIG. 10.

Figure 11:
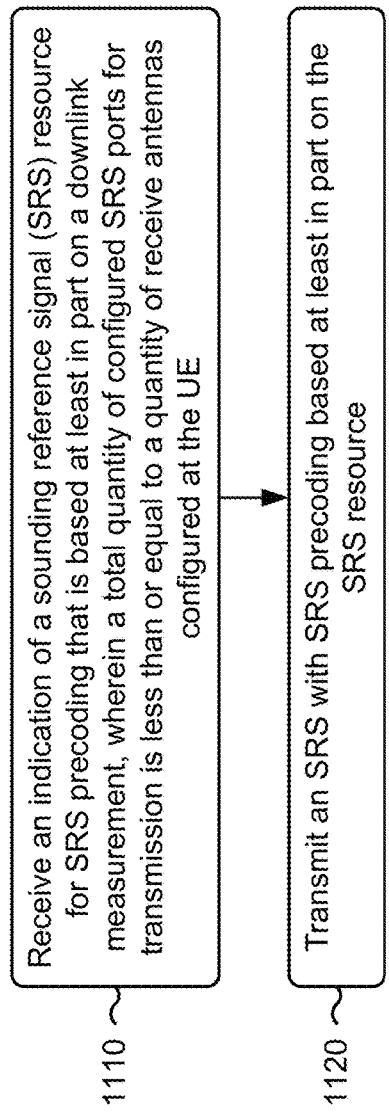
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., a UE 120, UE 1020) performs operations associated with SRS precoding.

As shown in FIG. 11, in some aspects, process 1100 may include receiving an indication of an SRS resource for SRS precoding that is based at least in part on a downlink measurement, where a total quantity of configured SRS ports for transmission is less than or equal to a quantity of receive antennas configured at the UE (block 1110). For example, the UE (e.g., using communication manager 1308 and/or reception component 1302 depicted in FIG. 13) may receive an indication of an SRS resource for SRS precoding that is based at least in part on a downlink measurement, where a total quantity of configured SRS ports for transmission is less than or equal to a quantity of receive antennas configured at the UE, as described above.

As further shown in FIG. 11, in some aspects, process 1100 may include transmitting an SRS with SRS precoding based at least in part on the SRS resource (block 1120). For example, the UE (e.g., using communication manager 1308 and/or transmission component 1304 depicted in FIG. 13) may transmit an SRS with SRS precoding based at least in part on the SRS resource, as described above.

Process 1100 may include additional aspects, such as any single aspect or any combination of aspects described below and/or in connection with one or more other processes described elsewhere herein.

In a first aspect, process 1100 includes selecting one or more SRS ports of the SRS resource such that a quantity of the one or more SRS ports is equal to or less than the total quantity of configured SRS ports.

In a second aspect, alone or in combination with the first aspect, transmitting the SRS includes transmitting the SRS using the one or more SRS ports.

In a third aspect, alone or in combination with one or more of the first and second aspects, the quantity of the one or more SRS ports is based at least part on one or more CSI-RS resources.

In a fourth aspect, alone or in combination with one or more of the first through third aspects, selecting the one or more SRS ports includes selecting the quantity of the one or more SRS ports to be equal to the total quantity of configured SRS ports.

In a fifth aspect, alone or in combination with one or more of the first through fourth aspects, selecting the one or more SRS ports includes selecting first SRS port numbers out of SRS port numbers for the configured SRS ports if the quantity of the one or more SRS ports is less than the total quantity of configured SRS ports.

In a sixth aspect, alone or in combination with one or more of the first through fifth aspects, selecting the one or more SRS ports includes selecting even SRS port numbers out of SRS port numbers for the total quantity of configured SRS ports if the quantity of the one or more SRS ports is half of the total quantity of configured SRS ports.

In a seventh aspect, alone or in combination with one or more of the first through sixth aspects, selecting the one or more SRS ports includes selecting odd SRS port numbers out of SRS port numbers for the total quantity of configured SRS ports if the quantity of the one or more SRS ports is half of the total quantity of configured SRS ports.

In an eighth aspect, alone or in combination with one or more of the first through seventh aspects, transmitting the SRS includes transmitting an SRS using an SRS sequence that is based at least in part on the quantity of the one or more SRS ports.

In a ninth aspect, alone or in combination with one or more of the first through eighth aspects, a comb offset and a cyclic shift for an SRS port of the SRS resource is based at least in part on the quantity of the one or more SRS ports.

In a tenth aspect, alone or in combination with one or more of the first through ninth aspects, a comb offset and a cyclic shift for an SRS port of the SRS resource is based at least in part on the total quantity of configured SRS ports and selected SRS port numbers.

In an eleventh aspect, alone or in combination with one or more of the first through tenth aspects, process 1100 includes transmitting a quantity indication of the quantity of the one or more SRS ports before each of multiple instances of the SRS resource.

In a twelfth aspect, alone or in combination with one or more of the first through eleventh aspects, process 1100 includes transmitting a quantity indication of the quantity of the one or more SRS ports for multiple instances of the SRS resource.

In a thirteenth aspect, alone or in combination with one or more of the first through twelfth aspects, process 1100 includes transmitting a quantity indication of the quantity of the one or more SRS ports based at least in part on a specified time duration between the indication and an instance of the SRS resource.

In a fourteenth aspect, alone or in combination with one or more of the first through thirteenth aspects, process 1100 includes transmitting a quantity indication of the quantity of the one or more SRS ports based at least in part on a specified periodicity associated with one or more CSI-RS resources.

In a fifteenth aspect, alone or in combination with one or more of the first through fourteenth aspects, process 1100 includes transmitting a capability indication of a UE capability of the UE to be configured with a quantity of transmit antennas that equals a quantity of received antennas of the UE.

In a sixteenth aspect, alone or in combination with one or more of the first through fifteenth aspects, transmitting the capability indication includes transmitting the capability indication with capability information dedicated to SRS precoding.

In a seventeenth aspect, alone or in combination with one or more of the first through sixteenth aspects, the capability indication further indicates a maximum quantity for one or more SRS ports of the SRS resource.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
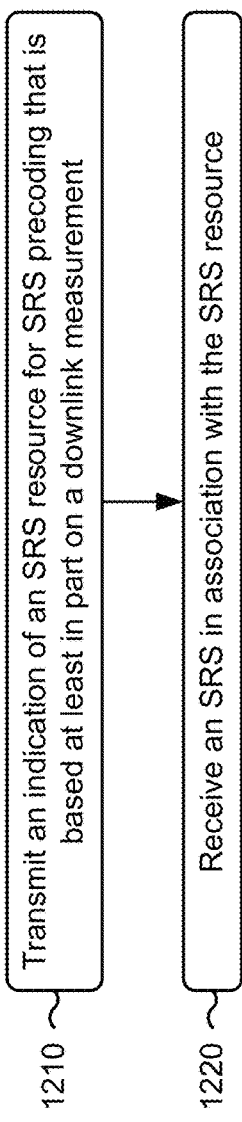
FIG. 12 is a diagram illustrating an example process performed, for example, by a network entity, in accordance with the present disclosure.

FIG. 12 is a diagram illustrating an example process 1200 performed, for example, by a network entity, in accordance with the present disclosure. Example process 1200 is an example where the network entity (e.g., base station 110, network entity 1010) performs operations associated with SRS precoding.

As shown in FIG. 12, in some aspects, process 1200 may include transmitting an indication of an SRS resource for SRS precoding that is based at least in part on a downlink measurement (block 1210). For example, the network entity (e.g., using communication manager 1408 and/or transmission component 1404 depicted in FIG. 14) may transmit an indication of an SRS resource for SRS precoding that is based at least in part on a downlink measurement, as described above.

As further shown in FIG. 12, in some aspects, process 1200 may include receiving an SRS in association with the SRS resource (block 1220). For example, the network entity (e.g., using communication manager 1408 and/or reception component 1402 depicted in FIG. 14) may receive an SRS in association with the SRS resource, as described above.

Process 1200 may include additional aspects, such as any single aspect or any combination of aspects described below and/or in connection with one or more other processes described elsewhere herein.

In a first aspect, process 1200 includes measuring the SRS, and transmitting a CSI-RS based at least in part on the SRS.

In a second aspect, alone or in combination with the first aspect, receiving the SRS includes receiving the SRS with an SRS sequence that is based at least in part on a quantity of one or more SRS ports used by a UE for transmission.

In a third aspect, alone or in combination with one or more of the first and second aspects, the quantity of the one or more SRS ports is equal to a total quantity of configured SRS ports for the UE.

In a fourth aspect, alone or in combination with one or more of the first through third aspects, process 1200 includes receiving a quantity indication of the quantity of the one or more SRS ports before each of multiple instances of the SRS resource.

In a fifth aspect, alone or in combination with one or more of the first through fourth aspects, process 1200 includes receiving a quantity indication of the quantity of the one or more SRS ports for multiple instances of the SRS resource.

In a sixth aspect, alone or in combination with one or more of the first through fifth aspects, process 1200 includes receiving a quantity indication of the quantity of the one or more SRS ports based at least in part on a specified time duration between the indication and an instance of the SRS resource.

In a seventh aspect, alone or in combination with one or more of the first through sixth aspects, process 1200 includes receiving a quantity indication of the quantity of the one or more SRS ports based at least in part on a specified periodicity associated with one or more CSI-RS resources.

In an eighth aspect, alone or in combination with one or more of the first through seventh aspects, process 1200 includes receiving a capability indication of a UE capability for being configured with a quantity of transmit antennas that equals a quantity of received antennas, where the indication of the SRS resource is based at least in part on the UE capability.

In a ninth aspect, alone or in combination with one or more of the first through eighth aspects, the capability indication further indicates a maximum quantity for one or more SRS ports of the SRS resource, and where the indication of the SRS resource is based at least in part on the maximum quantity.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
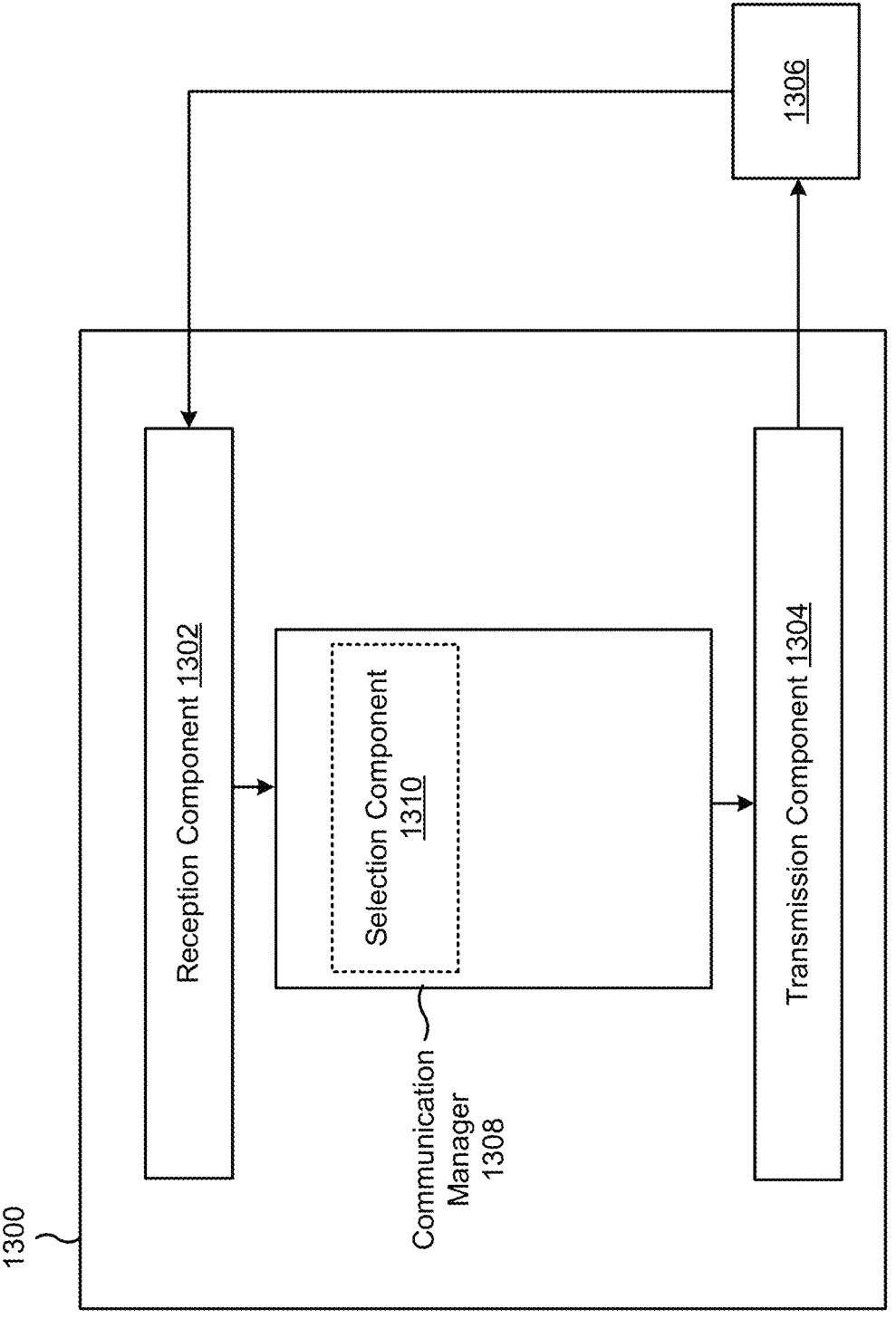
FIGS. 13-14 are diagrams of example apparatuses for wireless communication, in accordance with the present disclosure.

FIG. 13 is a diagram of an example apparatus 1300 for wireless communication, in accordance with the present disclosure. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 1308. The communication manager 1308 may control and/or otherwise manage one or more operations of the reception component 1302 and/or the transmission component 1304. In some aspects, the communication manager 1308 may include one or more antennas, a modem, a controller/processor, a memory, or a combination thereof, of the UE described in connection with FIG. 2. The communication manager 1308 may be, or be similar to, the communication manager 140 depicted in FIGS. 1 and 2. For example, in some aspects, the communication manager 1308 may be configured to perform one or more of the functions described as being performed by the communication manager 140. In some aspects, the communication manager 1308 may include the reception component 1302 and/or the transmission component 1304. The communication manager 1308 may include a selection component 1310, among other examples.

In some aspects, the apparatus 1300 may be configured to perform one or more operations described herein in connection with FIGS. 1-10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive an indication of a SRS resource for SRS precoding that is based at least in part on a downlink measurement, where a total quantity of configured SRS ports for transmission is less than or equal to a quantity of receive antennas configured at the UE. The transmission component 1304 may transmit an SRS with SRS precoding based at least in part on the SRS resource.

The selection component 1310 may select one or more SRS ports of the SRS resource such that a quantity of the one or more SRS ports is equal to or less than the total quantity of configured SRS ports.

The transmission component 1304 may transmit a quantity indication of the quantity of the one or more SRS ports before each of multiple instances of the SRS resource. The transmission component 1304 may transmit a quantity indication of the quantity of the one or more SRS ports for multiple instances of the SRS resource. The transmission component 1304 may transmit a quantity indication of the quantity of the one or more SRS ports based at least in part on a specified time duration between the indication and an instance of the SRS resource. The transmission component 1304 may transmit a quantity indication of the quantity of the one or more SRS ports based at least in part on a specified periodicity associated with one or more channel state information reference signal resources.

The transmission component 1304 may transmit a capability indication of a UE capability of the UE to be configured with a quantity of transmit antennas that equals a quantity of received antennas of the UE.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
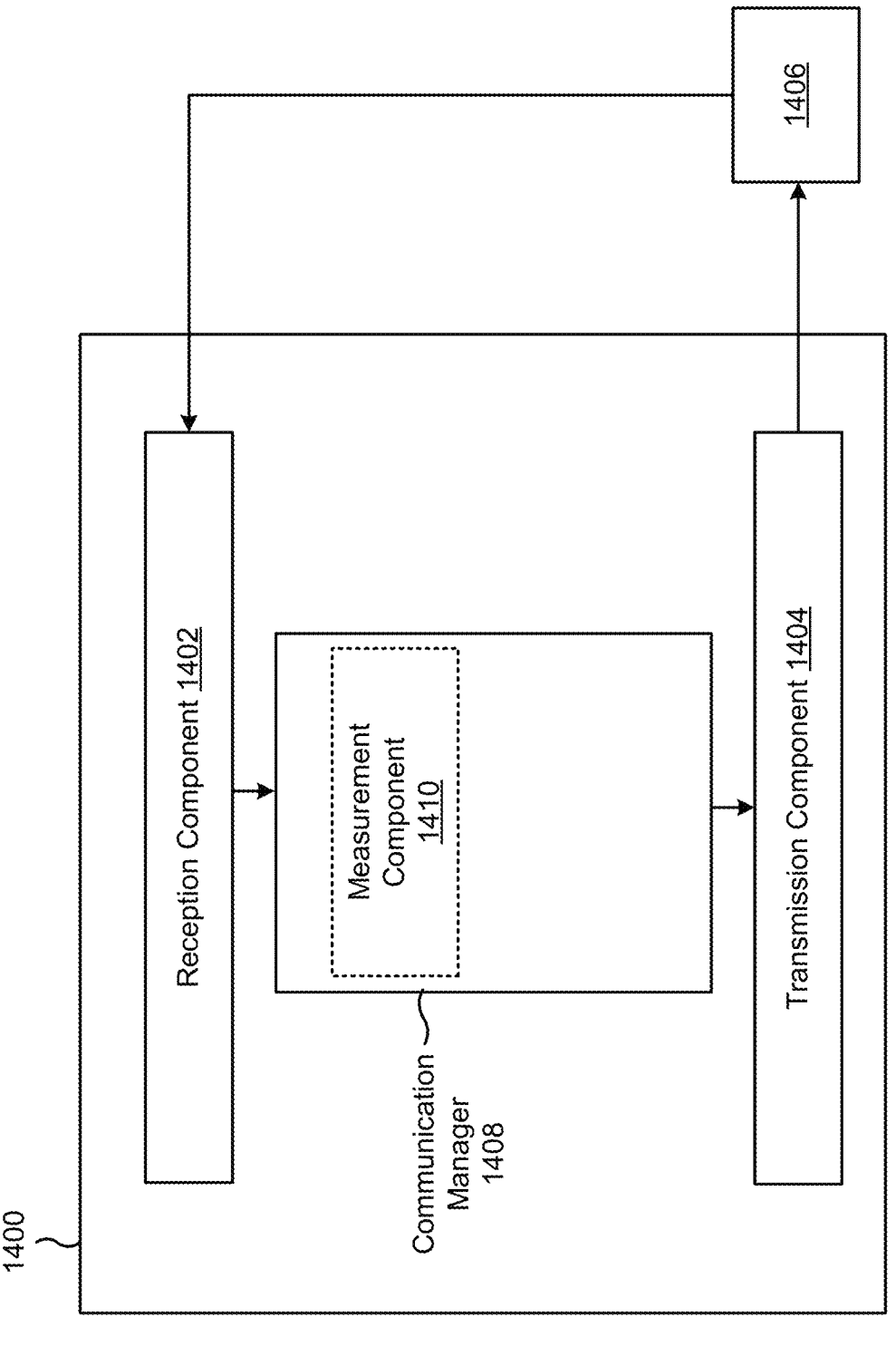

FIG. 14 is a diagram of an example apparatus 1400 for wireless communication, in accordance with the present disclosure. The apparatus 1400 may be a network entity, or a network entity may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 1408. The communication manager 1408 may control and/or otherwise manage one or more operations of the reception component 1402 and/or the transmission component 1404. In some aspects, the communication manager 1408 may include one or more antennas, a modem, a controller/processor, a memory, or a combination thereof, of the network entity described in connection with FIG. 2. The communication manager 1408 may be, or be similar to, the communication manager 150 depicted in FIGS. 1 and 2. For example, in some aspects, the communication manager 1408 may be configured to perform one or more of the functions described as being performed by the communication manager 150. In some aspects, the communication manager 1408 may include the reception component 1402 and/or the transmission component 1404. The communication manager 1408 may a measurement component 1410, among other examples.

In some aspects, the apparatus 1400 may be configured to perform one or more operations described herein in connection with FIGS. 1-10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the network entity described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network entity described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the network entity described in connection with FIG. 2. In some aspects, the transmission component 1404 may be co-located with the reception component 1402 in a transceiver.

The transmission component 1404 may transmit an indication of an SRS resource for SRS precoding that is based at least in part on a downlink measurement. The reception component 1402 may receive an SRS in association with the SRS resource.

The measurement component 1410 may measure the SRS. The transmission component 1404 may transmit a CSI-RS based at least in part on the SRS.

The reception component 1402 may receive a quantity indication of the quantity of the one or more SRS ports before each of multiple instances of the SRS resource. The reception component 1402 may receive a quantity indication of the quantity of the one or more SRS ports for multiple instances of the SRS resource. The reception component 1402 may receive a quantity indication of the quantity of the one or more SRS ports based at least in part on a specified time duration between the indication and an instance of the SRS resource. The reception component 1402 may receive a quantity indication of the quantity of the one or more SRS ports based at least in part on a specified periodicity associated with one or more channel state information reference signal resources.

The reception component 1402 may receive a capability indication of a UE capability for being configured with a quantity of transmit antennas that equals a quantity of received antennas, where the indication of the SRS resource is based at least in part on the UE capability.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving an indication of a sounding reference signal (SRS) resource for SRS precoding that is based at least in part on a downlink measurement, wherein a total quantity of configured SRS ports for transmission is less than or equal to a quantity of receive antennas configured at the UE; and transmitting an SRS with SRS precoding based at least in part on the SRS resource.

Aspect 2: The method of Aspect 1, further comprising selecting one or more SRS ports of the SRS resource such that a quantity of the one or more SRS ports is equal to or less than the total quantity of configured SRS ports.

Aspect 3: The method of Aspect 2, wherein transmitting the SRS includes transmitting the SRS using the one or more SRS ports.

Aspect 4: The method of Aspect 2 or 3, wherein the quantity of the one or more SRS ports is based at least part on one or more channel state information reference signal resources.

Aspect 5: The method of any of Aspects 2-4, wherein selecting the one or more SRS ports includes selecting the quantity of the one or more SRS ports to be equal to the total quantity of configured SRS ports.

Aspect 6: The method of any of Aspects 2-4, wherein selecting the one or more SRS ports includes selecting first SRS port numbers out of SRS port numbers for the configured SRS ports if the quantity of the one or more SRS ports is less than the total quantity of configured SRS ports.

Aspect 7: The method of any of Aspects 2-4, wherein selecting the one or more SRS ports includes selecting even SRS port numbers out of SRS port numbers for the total quantity of configured SRS ports if the quantity of the one or more SRS ports is half of the total quantity of configured SRS ports.

Aspect 8: The method of any of Aspects 2-4, wherein selecting the one or more SRS ports includes selecting odd SRS port numbers out of SRS port numbers for the total quantity of configured SRS ports if the quantity of the one or more SRS ports is half of the total quantity of configured SRS ports.

Aspect 9: The method of any of Aspects 2-8, wherein transmitting the SRS includes transmitting an SRS using an SRS sequence that is based at least in part on the quantity of the one or more SRS ports.

Aspect 10: The method of any of Aspects 2-9, wherein a comb offset and a cyclic shift for an SRS port of the SRS resource is based at least in part on the quantity of the one or more SRS ports.

Aspect 11: The method of any of Aspects 2-10, wherein a comb offset and a cyclic shift for an SRS port of the SRS resource is based at least in part on the total quantity of configured SRS ports and selected SRS port numbers.

Aspect 12: The method of Aspect 11, further comprising transmitting a quantity indication of the quantity of the one or more SRS ports before each of multiple instances of the SRS resource.

Aspect 13: The method of Aspect 11, further comprising transmitting a quantity indication of the quantity of the one or more SRS ports for multiple instances of the SRS resource.

Aspect 14: The method of Aspect 11, further comprising transmitting a quantity indication of the quantity of the one or more SRS ports based at least in part on a specified time duration between the indication and an instance of the SRS resource.

Aspect 15: The method of Aspect 11, further comprising transmitting a quantity indication of the quantity of the one or more SRS ports based at least in part on a specified periodicity associated with one or more channel state information reference signal resources.

Aspect 16: The method of any of Aspects 1-15, further comprising transmitting a capability indication of a UE capability of the UE to be configured with a quantity of transmit antennas that equals a quantity of received antennas of the UE.

Aspect 17: The method of Aspect 16, wherein transmitting the capability indication includes transmitting the capability indication with capability information dedicated to SRS precoding.

Aspect 18: The method of Aspect 16 or 17, wherein the capability indication further indicates a maximum quantity for one or more SRS ports of the SRS resource.

Aspect 19: A method of wireless communication performed by a network entity, comprising: transmitting an indication of a sounding reference signal (SRS) resource for SRS precoding that is based at least in part on a downlink measurement; and receiving an SRS in association with the SRS resource.

Aspect 20: The method of Aspect 19, further comprising: measuring the SRS; and transmitting a channel state information reference signal based at least in part on the SRS.

Aspect 21: The method of Aspect 19 or 20, wherein receiving the SRS includes receiving the SRS with an SRS sequence that is based at least in part on a quantity of one or more SRS ports used by a user equipment (UE) for transmission.

Aspect 22: The method of Aspect 21, wherein the quantity of the one or more SRS ports is equal to a total quantity of configured SRS ports for the UE.

Aspect 23: The method of Aspect 21, further comprising receiving a quantity indication of the quantity of the one or more SRS ports before each of multiple instances of the SRS resource.

Aspect 24: The method of Aspect 21, further comprising receiving a quantity indication of the quantity of the one or more SRS ports for multiple instances of the SRS resource.

Aspect 25: The method of Aspect 21, further comprising receiving a quantity indication of the quantity of the one or more SRS ports based at least in part on a specified time duration between the indication and an instance of the SRS resource.

Aspect 26: The method of Aspect 21, further comprising receiving a quantity indication of the quantity of the one or more SRS ports based at least in part on a specified periodicity associated with one or more channel state information reference signal resources.

Aspect 27: The method of any of Aspects 19-26, further comprising receiving a capability indication of a user equipment (UE) capability for being configured with a quantity of transmit antennas that equals a quantity of received antennas, wherein the indication of the SRS resource is based at least in part on the UE capability.

Aspect 28: The method of Aspect 27, wherein the capability indication further indicates a maximum quantity for one or more SRS ports of the SRS resource, and wherein the indication of the SRS resource is based at least in part on the maximum quantity.

Aspect 29: An apparatus for wireless communication at a device, comprising a processor; memory coupled with the processor; and instructions stored in the memory and executable by the processor to cause the apparatus to perform the method of one or more of Aspects 1-28.

Aspect 30: A device for wireless communication, comprising a memory and one or more processors coupled to the memory, the one or more processors configured to perform the method of one or more of Aspects 1-28.

Aspect 31: An apparatus for wireless communication, comprising at least one means for performing the method of one or more of Aspects 1-28.

Aspect 32: A non-transitory computer-readable medium storing code for wireless communication, the code comprising instructions executable by a processor to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors coupled to the one or more memories, the one or more processors individually or collectively configured to cause the UE to:

receive a resource indication of a sounding reference signal (SRS) resource for SRS precoding that is based at least in part on a downlink measurement, wherein a total quantity of configured SRS ports for transmission is less than or equal to a quantity of receive antennas configured at the UE;

select one or more SRS ports of the SRS resource such that a quantity of the one or more SRS ports is equal to or less than the total quantity of configured SRS ports;

transmit an SRS with SRS precoding based at least in part on the SRS resource; and transmit a quantity indication of the quantity of the one or more SRS ports, wherein the transmission of the quantity indication is based at least in part on at least one of:

a specified time duration between the resource indication and an instance of the SRS resource, or a specified periodicity associated with one or more channel state information reference signal resources.

2. The UE of claim 1, wherein the one or more processors, to transmit the SRS, are individually or collectively configured to cause the UE to transmit the SRS using the one or more SRS ports.

3. The UE of claim 1, wherein the quantity of the one or more SRS ports is based at least part on the one or more channel state information reference signal resources.

4. The UE of claim 1, wherein the one or more processors, to select the one or more SRS ports, are individually or collectively configured to cause the UE to select the quantity of the one or more SRS ports to be equal to the total quantity of configured SRS ports.

5. The UE of claim 1, wherein the one or more processors, to select the one or more SRS ports, are individually or collectively configured to cause the UE to select first SRS port numbers out of SRS port numbers for the configured SRS ports if the quantity of the one or more SRS ports is less than the total quantity of configured SRS ports.

6. The UE of claim 1, wherein the one or more processors, to select the one or more SRS ports, are individually or collectively configured to cause the UE to select even SRS port numbers out of SRS port numbers for the total quantity of configured SRS ports if the quantity of the one or more SRS ports is half of the total quantity of configured SRS ports.

7. The UE of claim 1, wherein the one or more processors, to select the one or more SRS ports, are individually or collectively configured to cause the UE to select odd SRS port numbers out of SRS port numbers for the total quantity of configured SRS ports if the quantity of the one or more SRS ports is half of the total quantity of configured SRS ports.

8. The UE of claim 1,
wherein the one or more processors, to transmit the SRS, are individually or collectively configured to cause the UE to transmit the SRS using an SRS sequence that is based at least in part on the quantity of the one or more SRS ports.

9. The UE of claim 1,
wherein a comb offset and a cyclic shift for an SRS port of the SRS resource is based at least in part on the quantity of the one or more SRS ports.

10. The UE of claim 1,
wherein a comb offset and a cyclic shift for an SRS port of the SRS resource is based at least in part on the total quantity of configured SRS ports and selected SRS port numbers.

11. The UE of claim 1,
wherein the one or more processors, to transmit the quantity indication of the quantity of the one or more SRS ports, are individually or collectively configured to cause the UE to transmit the quantity indication of the quantity of the one or more SRS ports before each of multiple instances of the SRS resource.

12. The UE of claim 1,
wherein the one or more processors, to transmit the quantity indication of the quantity of the one or more SRS ports, are individually or collectively configured to cause the UE to transmit the quantity indication of the quantity of the one or more SRS ports for multiple instances of the SRS resource.

13. The UE of claim 1,
wherein the transmission of the quantity indication is based at least in part on the specified time duration.

14. The UE of claim 1,
wherein the transmission of the quantity indication is based at least in part on the specified periodicity.

15. The UE of claim 1,
wherein the one or more processors are individually or collectively configured to cause the UE to transmit a capability indication of a UE capability of the UE to be configured with a quantity of transmit antennas that equals a quantity of received antennas of the UE.

16. The UE of claim 15,
wherein the one or more processors, to transmit the capability indication, are individually or collectively configured to cause the UE to transmit the capability indication with capability information dedicated to SRS precoding.

17. The UE of claim 15,
wherein the capability indication further indicates a maximum quantity for the one or more SRS ports.

18. A network entity for wireless communication, comprising:
one or more memories; and
one or more processors coupled to the one or more memories, the one or more processors individually or collectively configured to cause the network entity to:
transmit a resource indication of a sounding reference signal (SRS) resource for SRS precoding that is based at least in part on a downlink measurement; and
receive an SRS with an SRS sequence that is based at least in part on a quantity of one or more SRS ports used by a user equipment (UE) for transmission; and
receive a quantity indication of the quantity of the one or more SRS ports, wherein the reception of the quantity indication is based at least in part on at least one of:

a specified time duration between the resource indication and an instance of the SRS resource, or
a specified periodicity associated with one or more channel state information reference signal resources.

19. The network entity of claim 18,
wherein the one or more processors are individually or collectively configured to cause the network entity to:
measure the SRS; and
transmit a channel state information reference signal based at least in part on the SRS.

20. The network entity of claim 18,
wherein the quantity of the one or more SRS ports is equal to a total quantity of configured SRS ports for the UE.

21. The network entity of claim 18,
wherein the one or more processors, to receive the quantity indication of the quantity of the one or more SRS ports, are individually or collectively configured to cause the network entity to receive the quantity indication of the quantity of the one or more SRS ports before each of multiple instances of the SRS resource.

22. The network entity of claim 18,
wherein the one or more processors, to receive the quantity indication of the quantity of the one or more SRS ports, are individually or collectively configured to cause the network entity to receive the quantity indication of the quantity of the one or more SRS ports for multiple instances of the SRS resource.

23. The network entity of claim 18,
wherein the reception of the quantity indication is based at least in part on the specified time duration.

24. The network entity of claim 18,
wherein the reception of the quantity indication of the quantity of the one or more SRS ports is based at least in part on the specified periodicity.

25. The network entity of claim 18,
wherein the one or more processors are individually or collectively configured to cause the network entity to receive a capability indication of a UE capability for being configured with a quantity of transmit antennas that equals a quantity of received antennas, wherein the resource indication is based at least in part on the UE capability.

26. The network entity of claim 25,
wherein the capability indication further indicates a maximum quantity for the one or more SRS ports, and wherein the resource indication is based at least in part on the maximum quantity.

27. A method of wireless communication performed by a user equipment (UE), comprising:
receiving a resource indication of a sounding reference signal (SRS) resource for SRS precoding that is based at least in part on a downlink measurement, wherein a total quantity of configured SRS ports for transmission is less than or equal to a quantity of receive antennas configured at the UE;
selecting one or more SRS ports of the SRS resource such that a quantity of the one or more SRS ports is equal to or less than the total quantity of configured SRS ports;
transmitting an SRS with SRS precoding based at least in part on the SRS resource; and
transmitting a quantity indication of the quantity of the one or more SRS ports, wherein the transmission of the quantity indication is based at least in part on at least one of:
a specified time duration between the resource indication and an instance of the SRS resource, or a specified periodicity associated with one or more channel state information reference signal resources.

28. The method of claim 27, wherein transmitting the SRS comprises transmitting the SRS using the one or more SRS ports.

29. The method of claim 27, wherein the quantity of the one or more SRS ports is based at least part on the one or more channel state information reference signal resources.

30. A method of wireless communication performed by a network entity, comprising:

transmitting a resource indication of a sounding reference signal (SRS) resource for SRS precoding that is based at least in part on a downlink measurement; and receiving an SRS with an SRS sequence that is based at least in part on a quantity of one or more SRS ports used by a user equipment (UE) for transmission; and receiving a quantity indication of the quantity of the one or more SRS ports, wherein the reception of the quantity indication is based at least in part on at least one of:

a specified time duration between the resource indication and an instance of the SRS resource, or a specified periodicity associated with one or more channel state information reference signal resources.

\* \* \* \* \*